United States Patent
Niro (10) Patent No.: US 11,412,315 B2
(45) Date of Patent: Aug. 9, 2022

(54) SYSTEM AND METHODS FOR VIEWABLE HIGHLIGHT PLAYBACKS

(71) Applicant: Ryan Niro, Copley, OH (US)

(72) Inventor: Ryan Niro, Copley, OH (US)

(73) Assignee: Ryan Niro, Copley, OH (US)

( * ) Notice: Subject to any disclaimer, the term of this patent is extended or adjusted under 35 U.S.C. 154(b) by 0 days.

(21) Appl. No.: 17/499,387

(22) Filed: Oct. 12, 2021

(65) Prior Publication Data

US 2022/0116690 A1 Apr. 14, 2022

Related U.S. Application Data (60) Provisional application No. 63/090,458, filed on Oct. 12, 2020.

(51) Int. Cl.
*H04N 21/8549* (2011.01)
*H04N 21/858* (2011.01)
*H04N 21/442* (2011.01)

(52) U.S. Cl.
CPC ... *H04N 21/8549* (2013.01); *H04N 21/44204* (2013.01); *H04N 21/8586* (2013.01)

(58) Field of Classification Search
CPC ......... H04N 21/8549; H04N 21/44204; H04N 21/8586
See application file for complete search history.

(56) References Cited

U.S. PATENT DOCUMENTS

| | | | |
|---|---|---|---|
| 8,702,504 B1* | 4/2014 | Hughes | H04N 21/8586 463/31 |
| 10,419,830 B2 | 9/2019 | Packard et al. | |
| 2014/0373079 A1* | 12/2014 | Friedrich | H04N 21/44008 725/88 |
| 2015/0163562 A1* | 6/2015 | Leventhal | H04N 21/854 725/116 |
| 2016/0066042 A1* | 3/2016 | Dimov | H04N 21/8133 725/34 |
| 2016/0225410 A1* | 8/2016 | Lee | H04N 21/21805 |
| 2017/0169128 A1* | 6/2017 | Batchu Krishnaiahsetty | H04N 21/8405 |
| 2018/0077440 A1* | 3/2018 | Wadhera | H04N 21/23418 |
| 2018/0301169 A1* | 10/2018 | Ricciardi | H04N 21/8547 |
| 2018/0302694 A1* | 10/2018 | Noronha | G06F 16/48 |
| 2019/0166412 A1* | 5/2019 | Panchaksharaiah | H04N 21/4825 |
| 2019/0356948 A1* | 11/2019 | Stojancic | G06V 20/42 |
| 2020/0066305 A1* | 2/2020 | Spence | G11B 27/036 |

* cited by examiner

*Primary Examiner* — Oschta I Montoya
(74) *Attorney, Agent, or Firm* — Renner, Otto, Boisselle & Sklar, LLP (57) ABSTRACT

System and methods are described for generating one or more viewable highlight playbacks, such as, for example, a viewable highlight playback including highlights of a sporting event that may be viewed essentially on demand. The system and methods transform raw digital media data associated with the event to a playback instruction signal including key highlights of the event to be viewed over a predetermined time period while capturing an essence of the event. The system and methods allow control of a viewing of the viewable highlight playback utilizing, at least in part, the playback instruction signal.

14 Claims, 8 Drawing Sheets

SYSTEM AND METHODS FOR VIEWABLE HIGHLIGHT PLAYBACKS

RELATED APPLICATIONS

This application claims the benefit of U.S. Provisional Application No. 63/090,458 filed Oct. 12, 2020, which is hereby incorporated herein by reference.

FIELD OF INVENTION

The present application relates to digital media devices, such as digital media coding devices, and more particularly to a digital media coding system and methods for viewable highlight playbacks.

BACKGROUND OF THE INVENTION

Consumption of digital media content has become widespread and continues to grow. To present the digital media content to consumers, the digital media content typically has to be processed (i.e., encoded or compressed and decoded or decompressed). One exemplary conventional digital media device that processes digital media content is a video coding device, which may receive, encode, store, transmit, decode, and/or display digital media content.

However, conventional video coding devices have some drawbacks. For example, conventional video coding devices typically record and store irrelevant content, have limited viewing controls, and/or have limited viewing options. For example, if a conventional video coding device records and stores video content of a basketball game, the conventional video coding device records not only the basketball game, but also all irrelevant content (e.g., commercials) associated with the basketball game. With limited viewing controls and/or viewing options, if a user does not want to watch the irrelevant content or wants to view a particular portion of the basketball game, the only viewing control and/or viewing option available to the user is to fast forward through the irrelevant content, or to the particular portion of the basketball game that the user desires to view.

Effective encoding and decoding of digital media content, as well as effective viewing controls and/or viewing options associated with the digital media content, are therefore deficient in the various types of conventional video coding devices.

SUMMARY OF THE INVENTION

The present application describes a highly adaptable and adjustable system and methods for generating one or more viewable highlight playbacks, such as, for example, a viewable highlight playback including highlights of a basketball game that may be viewed essentially on demand. Embodiments of the present application transform raw digital media data associated with an event to a playback instruction signal including key highlights of the event to be viewed over a predetermined time period while capturing an essence of the event.

To accomplish this, the system and methods may transform at least a portion of raw digital media data associated with an event to a playback instruction signal including instructions associated with a viewable highlight playback. The instructions associated with the viewable highlight playback may allow operations to be performed on the raw digital media data associated with the event to generate the viewable highlight playback, which may be displayed to a consumer.

For example, at least a portion of raw digital media data associated with a basketball game may be transformed to a playback instruction signal including instructions associated with a viewable highlight playback containing highlight data representations of corresponding highlights of the basketball game. The playback instruction signal may be utilized to perform operations on the raw digital media data associated with the basketball game such that the highlights of the basketball game corresponding to the one or more highlight data representations of the basketball game may be displayed in accordance with the playback instruction signal.

More particularly, the system and methods of the present application receive raw digital media data associated with an event and encodes at least a portion of the raw digital media data to produce highlight data representations representative of corresponding highlights of the event. The highlight data representations may be ranked and a playback duration associated with the highlight data representations may be determined.

Highlight playback data representations may be selected from the highlight data representations based on the rank of the highlight data representations and the playback duration. Stated otherwise, highlight playback data representations corresponding to higher-ranked highlight data representations may be selected to be viewed over the period of time specified by the playback duration.

One exemplary benefit of selecting the highlight playback data representations in this manner includes allowing the system and methods to capture the essence of the event (e.g., by selecting highlights of the event to cover as much of the entire event, including from different points in time of the event, as possible) while showing the relatively more important highlights of the event. An exemplary scenario includes selecting highlight playback data representations of a basketball game from each quarter of the basketball game such that a viewer has a better understanding of what occurred throughout the entire event.

The system and methods generate a playback instruction signal based on the selected highlight playback data representations. The playback instruction signal may be decoded and the decoded playback instruction signal may be utilized to perform process the raw digital media data associated with the event to generate the viewable highlight playback. The viewable highlight playback may be configured to be displayed on any suitable display.

The system and methods may further provide improved control of viewing the viewable playback highlight. For example, the system and methods may utilize the decoded playback instruction signal to playback highlights of the event corresponding to highlight playback data representations. For example, the playback may include displaying a first highlight corresponding to a first highlight playback data representation. The system and methods monitor the playback to determine the current playback position. If the first highlight of the event is no longer being displayed, the system and methods may update the current playback position with a highlight playback position to display the next highlight of the event corresponding to the next highlight playback data representation. The process may be repeated until all highlights of the event corresponding to highlight playback data representations of the decoded playback instruction have been displayed. The system and methods may determine whether any additional playback instruction signals are present, and, if so, the process may be repeated.

As such, one exemplary practical application of the system and methods of the present application may be providing an improved viewing experience by transforming raw event data to a viewable highlight playback including at least key highlights selected to fit within a playback duration and by allowing the key highlights to be displayed essentially on demand by performing operations on the raw event data.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present application will now be described with reference to the drawings, wherein like reference numerals are used to refer to like elements throughout. It will be understood that the figures are not necessarily to scale.

Figure 1:
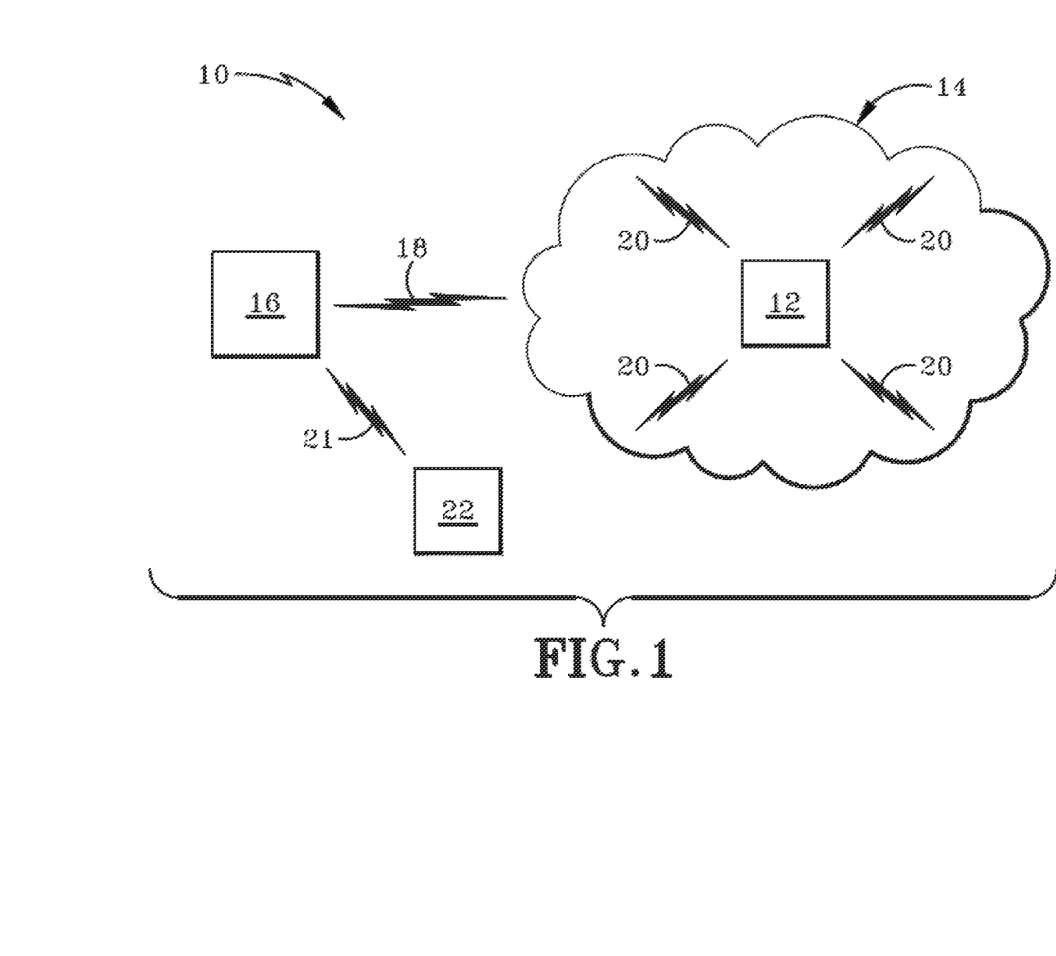
FIG. 1 is a drawing depicting an exemplary highlight playback system in accordance with the present application.

The present application describes a system and methods for generating at least one viewable highlight playback. FIG. 1 is a drawing depicting an exemplary highlight playback system 10 in accordance with the present application. The highlight playback system 10 may include a server 12, a communication network 14, and a client device 16.

The server 12 may be any suitable server, such as, for example, a local server or a remote server (e.g., a cloud server). In some implementations, the server 12 may store digital media data associated with an event, and the highlight playback system 10 may perform operations on the digital media data associated with the event to display one or more highlights of the event. Exemplary digital media data associated with the event may include video data (e.g., sporting events, concerts, etc.), audio data (e.g., presentations, speeches, lectures, podcasts, etc.), and/or any other suitable digital media data associated with any suitable event. While the server 12 has been described as storing digital media data associated with the event, it is to be understood that the server 12 may store any suitable data in any suitable data format.

The communication network 14 may be any suitable combination of one or more wired and/or wireless networks. For example, communication network 14 may include any one or more of the Internet, an intranet, a cloud network, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network.

Client device 16 may be connected via one or more communications links 18 to communication network 14 that may be linked via one or more communications links 20 to server 12. The communications links 18, 20 may be any communications links suitable for communicating data among client device 16 and server 12, such as for example networklinks, dial-up links, wireless links, hard-wired links, any other suitable communicationslinks, or any suitable combination of such links.

Client device 16 may include a communication and/or computing device, such as a multimedia device (e.g., a digital video recorder (DVR), a digital media receiver, a media streaming device, etc.), a mobile phone (e.g., a smart phone, a radiotelephone, etc.), a computer (e.g., a desktop computer, a laptop computer, a server device, a tablet computer, a handheld computer, etc.), a gaming device, a wearable communication device (e.g., a smart wristwatch, a pair of smart eyeglasses, etc.), or a similar type of device. In some implementations, client device 16 may provide data to server 12 to cause server 12 to perform various processes. In some implementations, client device 16 may receive data from the server 12 and may perform a response action based on the data received from the server 12. In some implementations, client device 16 may receive information from and/or transmit information to another device.

In some implementations, client device 16 may be connected via one or more communications links 21 to a display device 22 to display the viewable highlight playback to a user. Some exemplary display devices 22 include televisions, speakers, mobile phones, tablet computers, media players, desktop computers, laptop computers, vehicle entertainment systems, or any other suitable display device configured to display digital media content. The client 16 device and the display device 22 may provide digital media playback experiences to the user as more fully described herein. In some implementations, the client device 16, such as a DVR, may request one or more playback instruction signal from the server 12. The client device 16 may implement the one or more playback instruction signals to perform operations on the raw digital media data associated with the event to display the highlights of the event corresponding to the highlight playback data representations of the playback instruction signal on the display device 22, such as a television, and as further described below.

Figure 2:
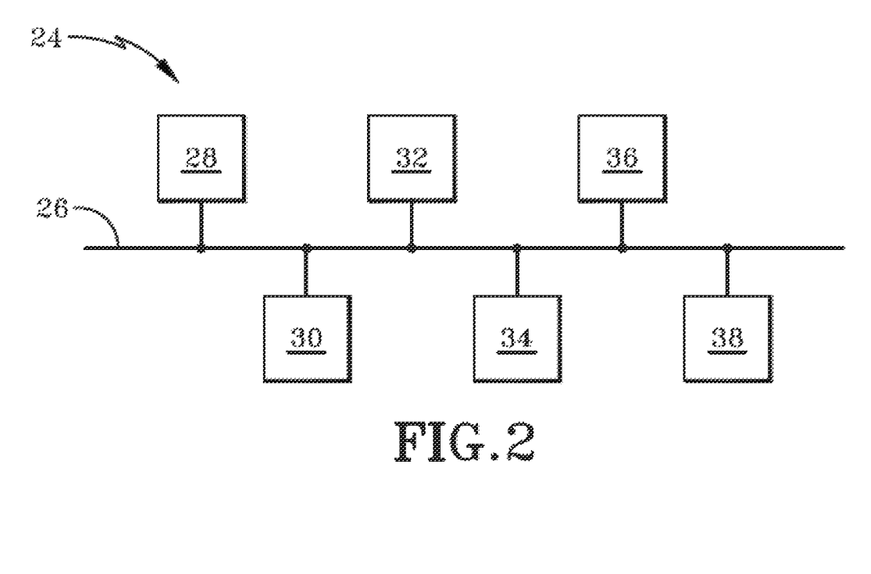
FIG. 2 is a drawing depicting exemplary components of a device of the highlight playback system in accordance with the present application.

FIG. 2 is a diagram of exemplary components of a device 24. Device 24 may correspond to server 12 and/or client device 16. In some implementations, server 12 and/or client device 16 may include one or more devices 24 and/or one or more components of device 24. As shown in FIG. 2, device 24 may include a bus 26, one or more processors 28, a memory 30, a storage component 32, an input component 34, an output component 36, and a communication interface 38.

Bus 26 may include a component that permits communication among the components of device 24. The one or more processors 28 may be implemented in hardware, firmware, or a combination of hardware and software. The one or more processors 28 may include a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, the one or more processors 28 may include one or more processors capable of being programmed to perform a function. Memory 30 may include a random access memory (RAM), a read only memory (ROM), and/or another type of dynamic or static storage device (e.g., a flash memory, a magnetic memory, and/or an optical memory) that stores information and/or instructions for use by the one or more processors 28.

Storage component 32 may store information and/or software related to the operation and use of device 24. For example, storage component 32 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 34 may include a component that permits device 24 to receive information, such as via a user input (e.g., a user utilizing a television remote control, a touch screen display, a keyboard, a keypad, a mouse, a button, a switch, and/or a microphone). Output component 36 may include a component that provides output information from device 24 (e.g., a display, a speaker, and/or one or more light-emitting diodes (LEDs)).

Communication interface 38 may include a transceiver-like component (e.g., a transceiver and/or a separate receiver and transmitter) that enables device 24 to communicate with other devices, such as via a wired connection, a wireless connection, or a combination of wired and wireless connections. Communication interface 38 may permit device 24 to receive information from another device and/or provide information to another device. For example, communication interface 38 may include an Ethernet interface, an optical interface, a coaxial interface, an infrared interface, a radio frequency (RF) interface, a universal serial bus (USB) interface, a Wi-Fi interface, a cellular network interface, or the like.

Device 24 may perform one or more processes described herein. Device 24 may perform these processes in response to the one or more processors 28 executing software instructions stored by a non-transitory computer-readable medium, such as memory 30 and/or storage component 32. A computer-readable medium is defined herein as a non-transitory memory device. A memory device includes memory space within a single physical storage device or memory space spread across multiple physical storage devices.

Software instructions may be read into memory 30 and/or storage component 32 from another computer-readable medium or from another device via communication interface 38. When executed, software instructions stored in memory 30 and/or storage component 32 may cause the one or more processors 28 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 24 may include additional components, fewer components, different components, or differently arranged components than those shown in FIG. 2. Additionally, or alternatively, a set of components (e.g., one or more components) of device 24 may perform one or more functions described as being performed by another set of components of device 24.

Figure 3:
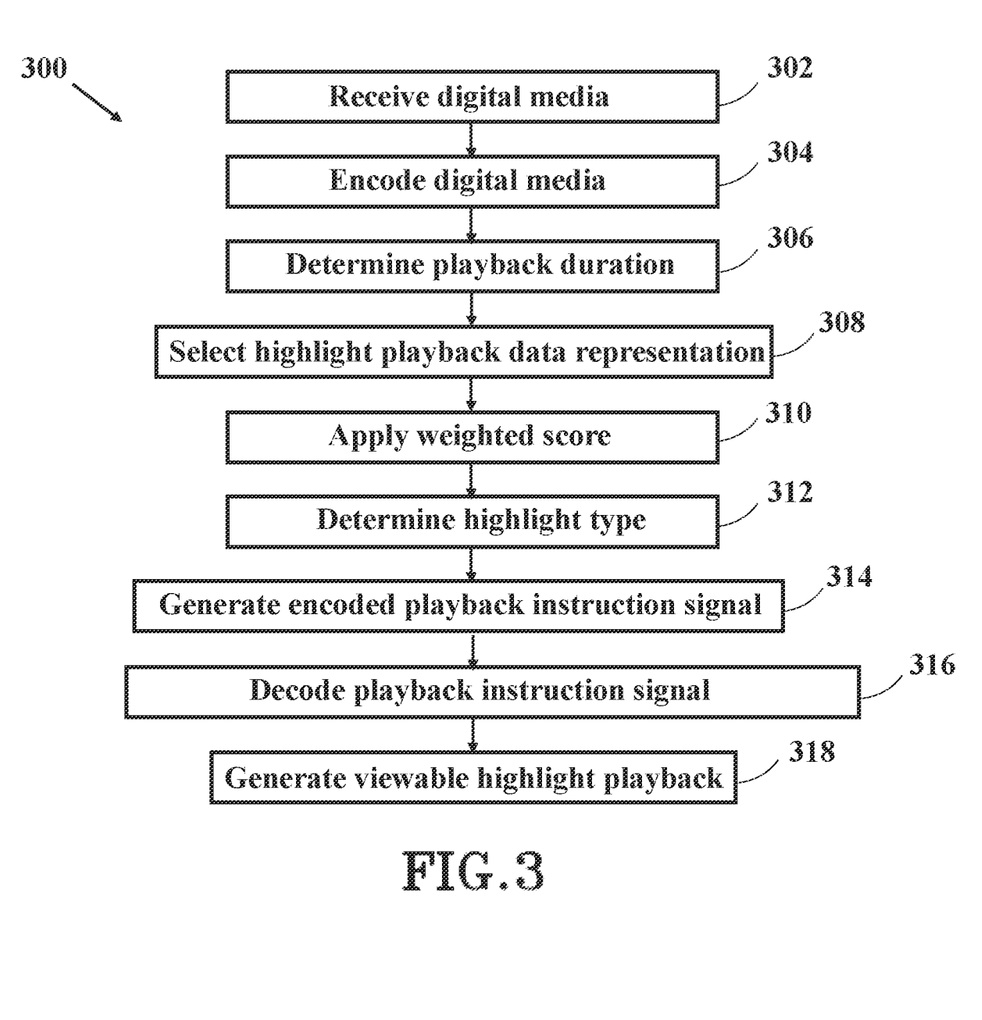
FIG. 3 is a flow chart depicting an exemplary method of generating at least one viewable highlight playback accordance with the present application.

FIG. 3 is a flow chart depicting an exemplary method for generating at least one viewable playback highlight in accordance with the present application, generally indicated at 300. In some implementations, one or more process blocks of FIG. 3 may be performed by server 12. In some implementations, one or more process blocks of FIG. 3 may be performed by another device or a group of devices separate from, or including, server 12, such as client device 16 or the like.

The method 300 may include receiving digital media data associated with an event, which is shown generally at 302. For example, server 12 may include device 24, and server 12 may utilize the one or more processors 28 to receive digital media data associated with an event, such as video data of a basketball game, from a digital media data source, such as a cable television provider, to be stored on the server 12. Although the digital media data associated with the event has been described as being stored on the server 12, it is to be understood that the digital media data associated with the event may be stored in any suitable location, such as, for example, within the client device 16.

The method 300 may include encoding at least a portion of the digital media data to produce one or more highlight data representations representative of corresponding one or more highlights of the event, which is shown generally at 304. The one or more highlight data representations may correspond to timeframe representations, which may be defined as highlight data representations including a specified start time and a specified end time, and single time marker representations, which may be defined as highlight data representations associated with a single particular time. Exemplary timeframe highlight representations associated with a sporting event may include a basketball possession, a football play, and a baseball at-bat. Exemplary single time marker highlight representations associated with a sporting event may include a basketball field goal attempt, a completed football pass, and a baseball home run.

For example, if video data of a sporting event is stored on the server 12, the one or more processors 28 may encode at least a portion of the video data of the sporting event to produce one or more highlight data representations representative of corresponding one or more highlights of the sporting event.

In some implementations, timeframe highlight representations may serve as parent highlights for other timeframe highlight representations and/or single time marker highlight representations. For example, and as shown in FIG. 4, the one or more processors 28 may generate a first timeframe highlight representation 40, a second timeframe highlight representation 42, a first single time marker highlight representation 44, and a second single time marker highlight representation 46.

Figure 4:
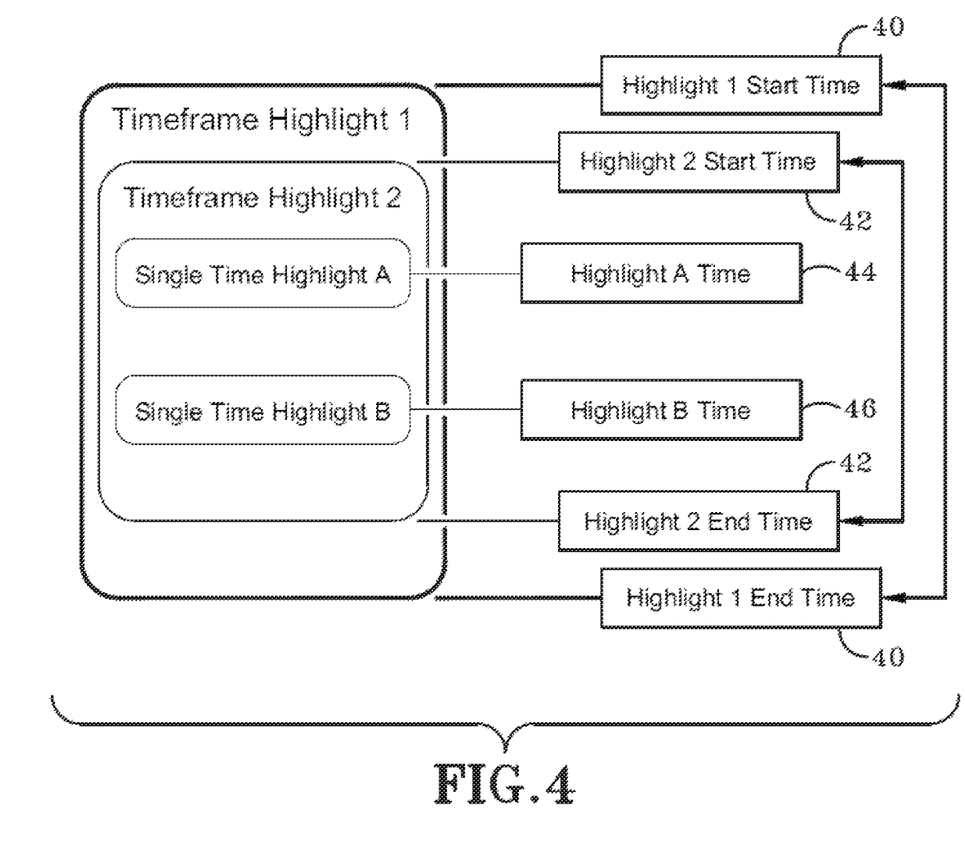
FIG. 4 is a drawing depicting exemplary timeframe highlight representations and single time marker highlight representations in accordance with the present application.

With continued reference to FIG. 4, the first single time marker highlight representation 44 and the second single time marker highlight representation 46 may occur within the time period of the first timeframe highlight representation 40 and the second timeframe highlight representation 42, and the second timeframe highlight representation 42 may occur within the time period of the first timeframe highlight representation 40. This may allow the timeframe highlight representations and single time marker highlight representations to be grouped in a grouping hierarchy that allows for a wide array of viewable highlight playback options as more fully described below.

Figure 5:
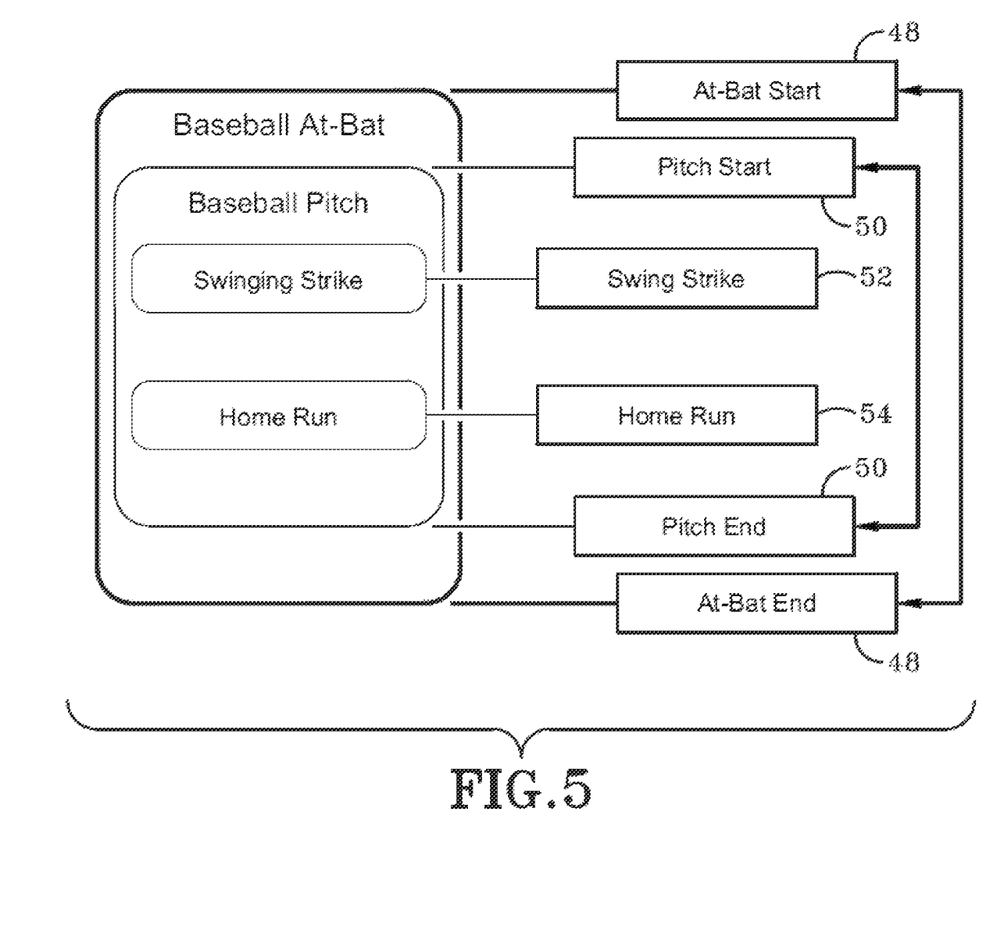
FIG. 5 is a drawing depicting exemplary timeframe highlight representations and single time marker highlight representations associated with a baseball game in accordance with the present application.

For example, and as shown in FIG. 5, if the sporting event is a baseball game, the one or more processors 28 may generate a baseball at-bat highlight representation 48 (i.e., a first timeframe highlight representation), a baseball pitch highlight representation 50 (i.e., a second timeframe highlight representation), a swinging strike highlight representation 52 (i.e., a first single time marker highlight representation), and a home run highlight representation 54 (i.e., a second single time marker highlight representation). With continued reference to FIG. 5, the swinging strike highlight representation 52 and the home run highlight representation 54 may occur within the time period of the at-bat highlight representation 48 and the baseball pitch highlight representation 50, and the baseball pitch highlight representation 50 may occur within the time period of the at-bat highlight representation 48.

In some implementations, the one or more highlight data representations of corresponding one or more highlights of the event may be encoded by an operator interacting with an operator interface (e.g., a control board with buttons) that is in operable communication with the one or more processors 28. For example, the operator may push buttons on the control board while viewing a video of the digital media data associated with the event.

Each push of a button, or combination of buttons, may record data associated with highlight data representations corresponding to highlights of an event, such as, for example, a timestamp, a highlight type, etc. The one or more processors 28 may encode the recorded data to produce the one or more highlight data representations corresponding to one or more of the highlights of the event. The one or more processors 28 may cause the recorded data associated with the highlight data representations corresponding to highlights of an event to be stored in a relational database.

Figure 6:
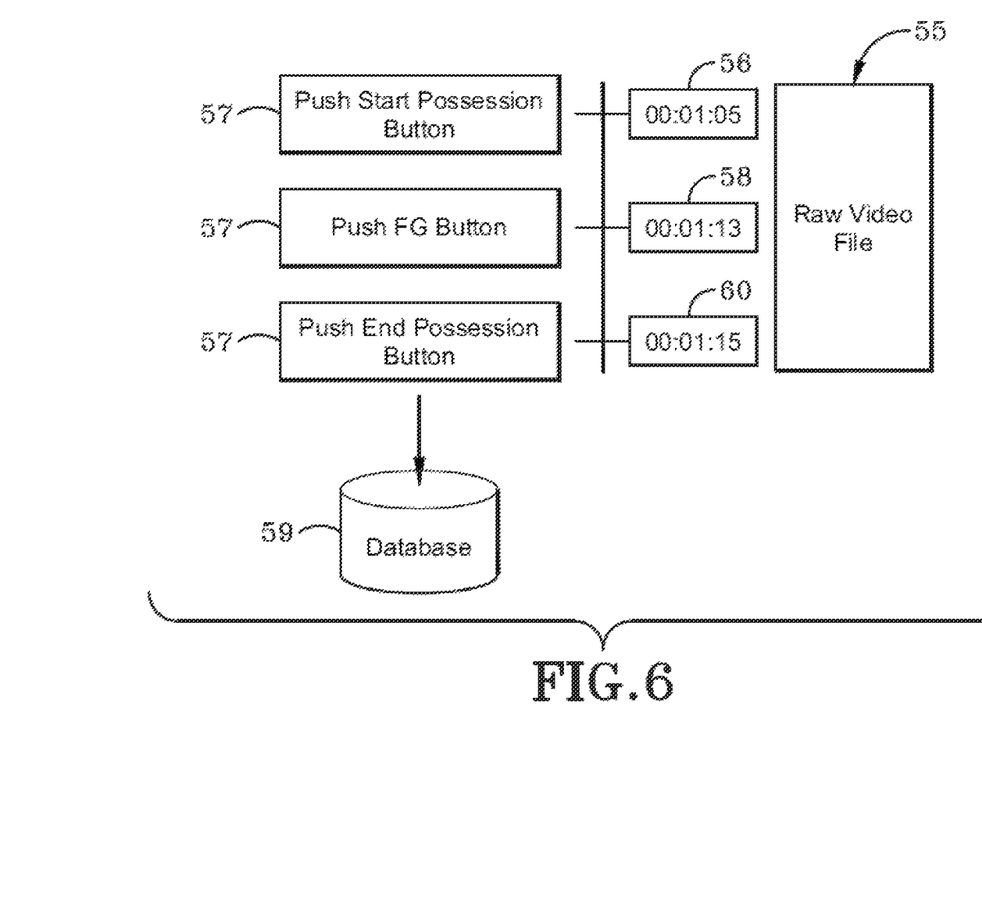
FIG. 6 is a drawing depicting exemplary components of the highlight playback system associated with generation of exemplary timeframe highlight representations and single time marker highlight representations of a basketball game in accordance with the present application.

For example, and as shown in FIG. 6, if the sporting event is a basketball game, the operator may view the basketball game to record data (e.g., encode a portion of the raw digital media data file 55) associated with highlight data representations corresponding to highlights of the basketball game by pushing buttons 57 at various times throughout the basketball game.

With continued reference to FIG. 6, the operator may push a button at the start of an away team possession highlight representation 56 (i.e., start time of timeframe highlight representation), during a made field goal of the away team highlight representation 58 (i.e., single time marker highlight representation), and at the end of the away team possession highlight representation 60 (i.e., end time of timeframe highlight representation) to record data (e.g., a timestamp) associated with each of the away team possession highlight representation 56, the made field goal of the away team highlight representation 58 and the end of the away team possession highlight representation 60.

The one or more processors 28 may encode the recorded data associated with each of the away team possession highlight representation 56, the made field goal of the away team highlight representation 58 and the end of the away team possession highlight representation 60 to produce the highlight data representations corresponding to the highlights of the event.

In some implementations, the control board and button configuration may be tailored to a particular type of event (e.g., basketball games, baseball games, lectures, etc.) to generate a wide array of highlight data associated with the event. For example, if the event is a basketball game, the control board may include buttons associated with team possession, team field goal, player, quarter, time period, and score highlight representations. As another example, if the sporting event is a baseball game, the control board may include buttons associated with team at-bat, team pitch, team strike, and team home run highlight representations.

In some implementations, instead of the operator pushing buttons 57 while viewing video of the event, the operator may push buttons to record data corresponding to statistical data 61 of the event. For example, and as shown in FIG. 7, if the sporting event is a basketball game, the operator may record data associated with highlights of the basketball game (e.g., encode a raw digital media data file 63) of the basketball game by pushing buttons 57 at times corresponding to the statistical data 61 of the basketball game.

Figure 7:
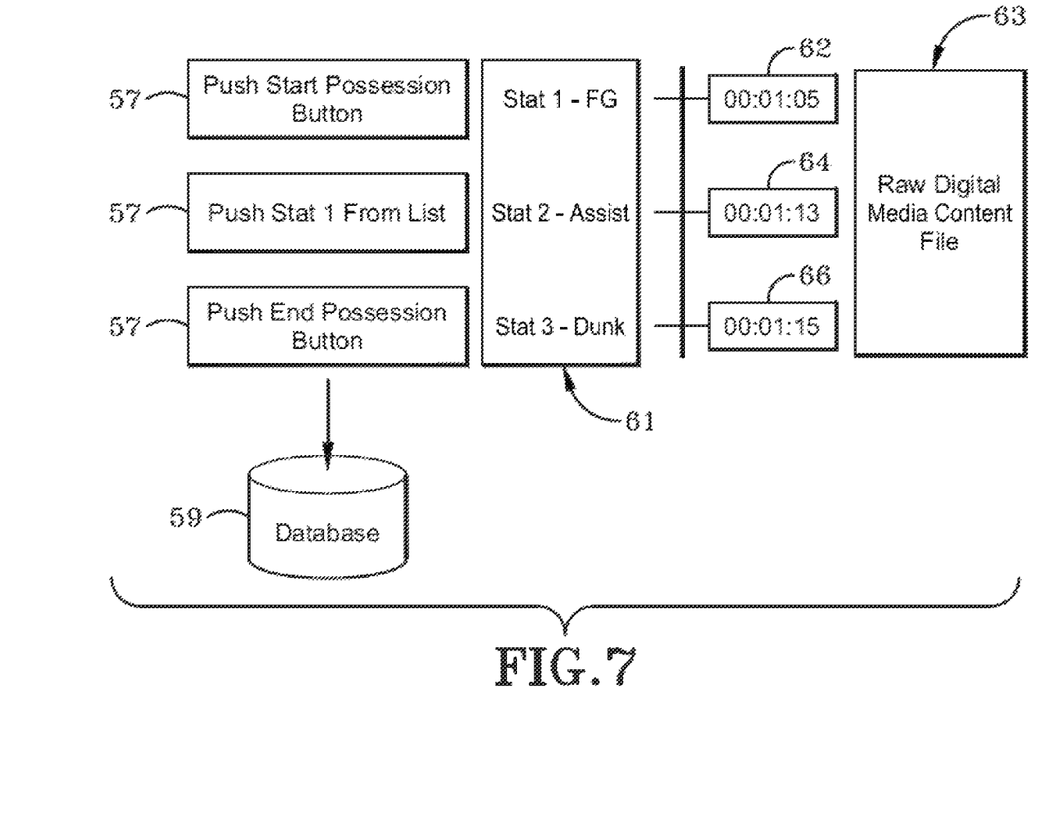
FIG. 7 is a drawing depicting exemplary components of the highlight playback system associated with generation of exemplary timeframe highlight representations and single time marker highlight representations associated with a basketball game in accordance with the present application.

With continued reference to FIG. 7, the operator may push a button at the start of an away team possession highlight representation 62 (i.e., statistical data may be a start time associated with a made field goal of the home team), during an away team assist highlight representation 64 (i.e., statistical data may be an assist of the away team), and at the end of the away team possession highlight representation 66 (i.e., statistical data may be a made field goal of the away team) to record data (e.g., a timestamp) associated with each of the away team possession highlight 62 representation, during an away team assist highlight representation 64, and at the end of the away team possession highlight representation 66.

The one or more processors 28 may encode the recorded data associated with each of the away team possession highlight representation 62, during an away team assist highlight representation 64, and at the end of the away team possession highlight representation 66 to generate the highlight data representations.

The method 300 may include determining a playback duration associated with the playback instruction signal, which is shown generally at 306. The one or more processors 28 may receive the playback duration via user input through the input component 34 (e.g., the user may input a playback duration to the client device 16 via a television remote control).

The method 300 may include selecting, from the one or more highlight data representations, at least one highlight playback data representation to include in the playback instruction signal based, at least in part, on at least one selection factor and the playback duration associated with the playback instruction signal, which is shown generally at 308.

An exemplary at least one selection factor may be a weighted score and the method 300 may include applying a weighted score to at least one of the one or more highlight data representations based, at least in part, on one or more weighting factors, which is shown generally at 310.

Exemplary weighting factors may include a current time of the event, event scenarios, score of the event, important event occurrences, types of highlights, or any other suitable weighting factor. If the sporting event is a basketball game, a highlight in the fourth quarter may be assigned a higher weighted score than a highlight in the first quarter, and a highlight containing a game-winning shot or buzzer beater may be assigned a higher weighted score than a highlight containing a field goal made in the second quarter.

Another exemplary selection factor may be a highlight type associated with the corresponding one or more highlights of the event and the method 300 may include determining a highlight type associated with the corresponding one or more highlights of the event, which is shown generally at 312. The method 300 may determine the at least one highlight type via user input through the input component 34 (e.g., the user may input the at least one highlight type to the client device 16 via a television remote control).

In some implementations, the method 300 may filter the one or more highlight data representations, based, at least in part, on the highlight type. For example, if the sporting event is a basketball game, and the at least one highlight type is all away team possessions and all home team possessions, the method 300 may use a filter to extract all away team possessions and all home team possessions from the one or more highlight data representations.

One exemplary benefit of selecting the at least one playback highlight data representation in this manner includes allowing the highlight playback system to capture the essence of the event as highlight data representations corresponding to highlights of the event can be selected to cover as much of the entire event, including from different points in time of the event, as possible while showing the relatively more important highlights of the event representations. An exemplary scenario includes selecting highlight playback representations of a basketball game from each quarter of the basketball game such that a viewer understands what occurred throughout the entire event (e.g., momentum swings, lead changes, etc.).

The method 300 may include iterating over the at least one highlight playback data representation to generate the playback instruction signal, which is shown generally at 314. The playback instruction signal may include any suitable data associated with the one or more highlight playback data representations. Exemplary data includes a uniform resource locator (URL), a start time, and an end time associated with each of the one or more highlight playback data representations.

The method 300 may include decoding the playback instruction signal to produce a decoded playback instruction signal, which is shown generally at 316.

The method 300 may include performing operations on the digital media data associated with the event based, at least in part, on the decoded playback instruction signal to generate the at least one viewable highlight playback, which is shown generally at 318. The at least one viewable highlight playback may be configured to be displayed on the display device 22. The operations performed on the digital media data may occur on the server 12, the client device 16, or in any other suitable location.

For example, the one or more processors 28 may decode the playback instruction signal, and, in turn, may process the raw digital media data associated with the event to display a particular portion and/or portions of the raw digital media data associated with the event corresponding to the at least one highlight playback data representation on the display device 22. This is at least advantageous compared to viewing digital media content using conventional digital media data devices, as conventional digital media data devices require a user to fast forward to view particular portions of the digital media content.

Figure 8:
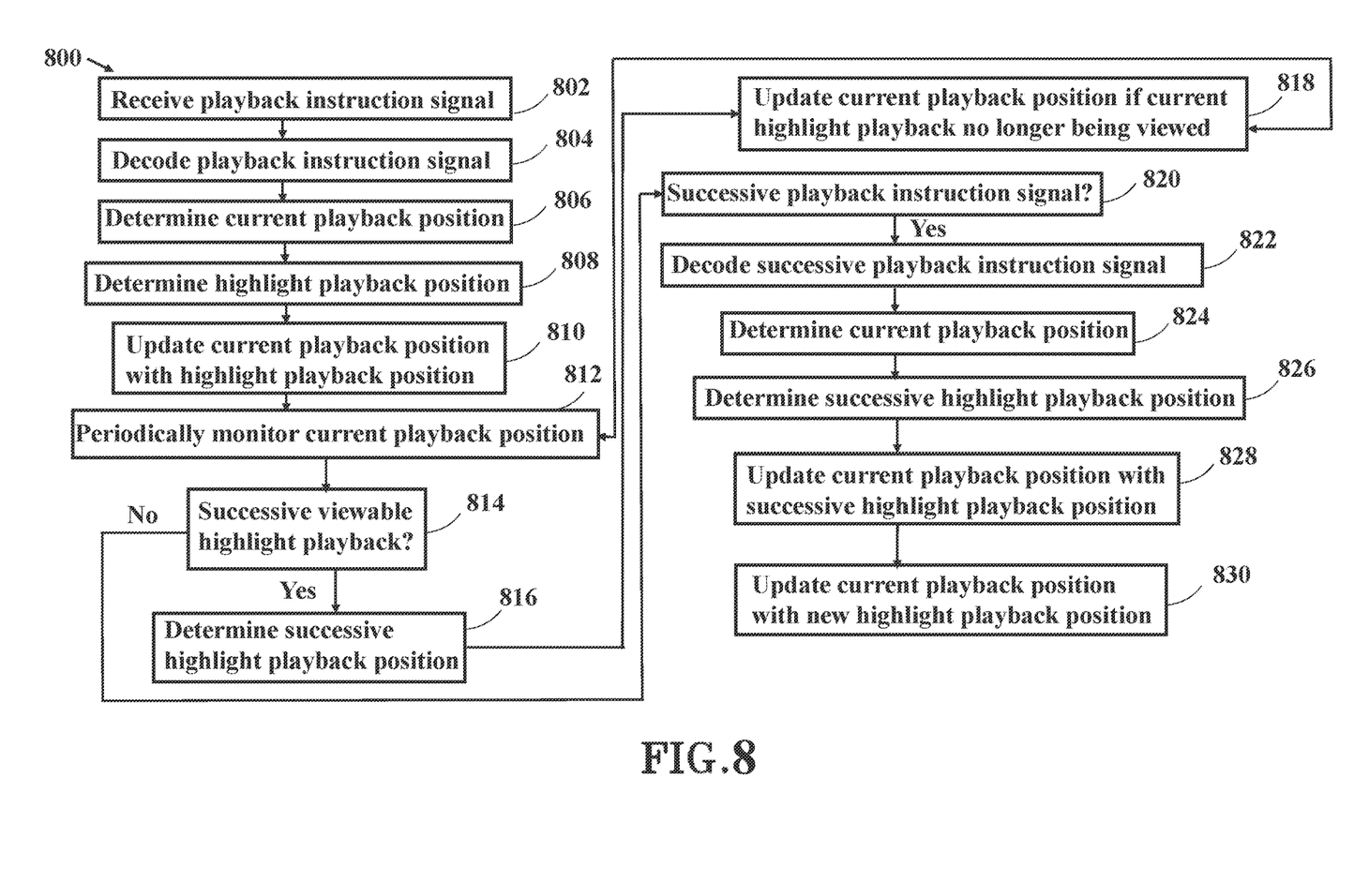
FIG. 8 is a flow chart depicting an exemplary method of controlling a viewing of at least one viewable highlight playback in accordance with the present application.

FIG. 8 is a flow chart depicting an exemplary method of controlling a viewing of at least one viewable highlight playback in accordance with the present application, generally indicated at 800. In some implementations, one or more process blocks of FIG. 8 may be performed by server 12. In some implementations, one or more process blocks of FIG. 8 may be performed by another device or a group of devices separate from, or including, server 12, such as client device 16 or the like.

In this exemplary implementation, the device 24 may be incorporated within the client device 16 (e.g., contained within a housing of the client device 16), digital media data associated with an event may be stored in the storage component 32 of the device 24, the one or more processors 28 may process the digital media data associated with the event, and the method 800 may utilize a playback instruction signal generated by the method 300 or any other suitable playback instruction signal including at least one highlight playback data representation corresponding to at least one highlight of an event and where the at least one highlight playback data representation corresponding to the at least one highlight of the event includes at least one identifier.

The method 800 may receive at least one playback instruction signal generated by the method 300, which is shown generally at 802.

The method 800 may decode the at least one playback instruction signal to produce at least one decoded playback instruction signal including a first viewable highlight playback of at least one viewable highlight playback corresponding to the at least one highlight playback data representation, which is shown generally at 804. To accomplish this, the method 800 may examine the at least one playback instruction signal to identify a first viewable highlight playback of at least one viewable highlight playback corresponding to the at least one highlight playback data representation.

The method 800 may determine a current playback position of the digital media data associated with the event, which is shown generally at 806.

The method 800 may determine a highlight playback position of the first viewable highlight playback based, at least in part, on at least one identifier of the one or more highlight data representations associated with the corresponding one or more highlights of the event, which is shown generally at 808. The at least one identifier may be a URL, a start time, and/or an end time associated with the first viewable highlight playback.

The method 800 may include performing operations on the digital media data associated with the event based, at least in part, on the decoded playback instruction signal to update the current playback position with the highlight playback position of the first viewable highlight playback, which is shown generally at 810.

For example, the client device 16 may display portions of the digital media data associated with the event corresponding to the first viewable highlight playback. In this example, if the first highlight playback is a single time marker highlight representation, such as a slam dunk highlight representation, the one or more processors 28 may determine the highlight playback information associated with slam dunk highlight representation. The playback highlight playback information associated with the slam dunk highlight representation may include the URL associated with the slam dunk highlight representation, the start time of the slam dunk highlight, and the end time of the slam dunk highlight representation. The client device 16 may display the portions of the digital media data associated with the event corresponding to the highlight playback information of the slam dunk highlight representation (e.g., the start time and the end time of the slam dunk highlight).

The method 800 may include monitoring the current playback position of the digital media data associated with the event to determine whether the first viewable highlight playback is being viewed, which is shown generally at 812. A time period associated with the monitoring the current playback position of the digital media data associated with the event may be 500 milliseconds or less; however any suitable time period may be utilized.

If the current playback position of the digital media data associated with the event is less than an end time of the first viewable highlight playback, the one or more processors 28 may do nothing further because the first viewable highlight playback is still being displayed by the client device 16. If the current playback position of the digital media data associated with the event is greater than the end time of the first viewable highlight playback, the first viewable highlight playback is over, and the method 800 may perform further processing as described herein.

The method 800 may determine whether the at least one viewable playback includes a successive viewable highlight playback, which is shown generally at 814.

The method 800 may include determining, if the at least one viewable highlight playback includes the successive viewable highlight playback, a successive highlight position of the successive viewable highlight playback, which is shown generally at 816.

The method 800 may include updating, if the first viewable highlight playback is no longer being viewed, the current playback position with the successive playback position, which is shown generally at 818.

The method 800 may include determining, if the at least one viewable highlight playback does not include a successive highlight, whether the at least one playback instruction signal includes a successive playback instruction signal, which is shown generally at 820.

The method 800 may include decoding, if the at least one viewable highlight playback does not include the successive viewable highlight playback and if the at least one playback instruction includes the successive playback instruction signal, the successive playback instruction signal to produce a successive decoded playback instruction signal including a successive first viewable highlight playback of at least one successive viewable highlight playback corresponding to the at least one highlight playback data representation, which is shown generally at 822.

The method 800 may include determining a current playback position of the digital media data associated with the event, which is shown generally at 824.

The method 800 may determine a highlight playback position of the successive first viewable highlight playback based, at least in part, on at least one identifier of the one or more highlight data representations associated with the corresponding one or more highlights of the event, which is shown generally at 826.

The method 800 may include performing operations on the digital media data associated with the event based, at least in part, on the successive decoded playback instruction signal to update the current playback position with the highlight playback position of the successive first viewable highlight playback, which is shown generally at 828.

The method 800 may include updating the current playback position with a new playback position of the digital media data associated with the event, which is shown generally at 830. For example, the display device 16 may toggle between the digital media data associated with the event and the viewable highlight playback at any time.

As stated above, the digital media data associated with an event may be any suitable digital media data associated with any suitable event. For example, if the digital media data associated with the event is audio data associated with a lecture, the system and methods described herein above may be configured to process the audio data in a similar manner as described herein. For example, a selection factor may be based on search terms (e.g., text, people, individual words, terms, phrases, topics, person speaking, etc.) from a user. In some implementations, natural language processing may also be utilized to generate the one or more highlight data representations.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A non-transitory computer-readable medium storing instructions, the instructions comprising:
   one or more instructions that, when executed by one or more processors, cause the one or more processors to:
   receive at least one playback instruction signal including at least one highlight playback data representation encoded from digital media data associated with an event; wherein the at least one highlight playback data representation corresponds to at least one highlight of the event; wherein the at least one highlight playback data representation corresponding to the at least one highlight of the event includes at least one identifier;
   decode the at least one playback instruction signal to produce at least one decoded playback instruction signal including a first viewable highlight playback of at least one viewable highlight playback corresponding to the at least one highlight playback data representation;
   determine a current playback position of digital media data associated with the event;
   determine a highlight playback position of the first viewable highlight playback based, at least in part, on the at least one identifier of the at least one highlight playback data representation corresponding to the at least one highlight of the event;

perform operations on the digital media data associated with the event based, at least in part, on the decoded playback instruction signal to update the current playback position with the highlight playback position of the first viewable highlight playback;

monitor the current playback position of the digital media data associated with the event to determine whether the first viewable highlight playback is being viewed;

determine, if the at least one viewable highlight playback does not include a successive highlight, whether the at least one playback instruction signal includes a successive playback instruction signal;

decode, if the at least one viewable highlight playback does not include the successive viewable highlight playback and if the at least one playback instruction signal includes the successive playback instruction signal, the successive playback instruction signal to produce a successive decoded playback instruction signal including a successive first viewable highlight playback of at least one successive viewable highlight playback corresponding to the at least one highlight playback data representation;

determine a current playback position of the digital media data associated with the event;

determine a successive highlight playback position of the successive first viewable highlight playback based, at least in part, on the at least one identifier of the at least one highlight playback data representation corresponding to the at least one highlight of the event; and perform operations on the digital media data associated with the event based, at least in part, on the successive decoded playback instruction signal to update the current playback position with the successive highlight playback position of the successive first viewable highlight playback.

2. The non-transitory computer-readable medium storing instructions of claim 1, further comprising:
one or more instructions that, when executed by one or more processors, cause the one or more processors to:
determine whether the at least one viewable playback includes a successive viewable highlight playback;
determine, if the at least one viewable highlight playback includes the successive viewable highlight playback, a successive playback position of the successive viewable highlight playback based, at least in part, on the at least one identifier of the at least one highlight playback data representation corresponding to the at least one highlight of the event; and
update, if the first viewable highlight playback is no longer being viewed, the current playback position with the successive playback position.

3. The non-transitory computer-readable medium storing instructions of claim 1, wherein the current playback position of the digital media data associated with the event is monitored at least every 500 milliseconds.

4. The non-transitory computer-readable medium storing instructions of claim 1, further comprising:
one or more instructions that, when executed by one or more processors, cause the one or more processors to:
update the current playback position with a new playback position of the digital media data associated with the event.

5. The non-transitory computer-readable medium storing instructions of claim 1, wherein the at least one identifier is at least one of a playback time associated with the corresponding at least one highlight of the event and a uniform resource locator (URL) associated with the corresponding at least one highlight of the event.

6. A device, comprising:
a communication interface;
a storage component; and
one or more processors to:
receive, at the communication interface, at least one playback instruction signal encoded from digital media data associated with an event;
wherein the at least one highlight playback data representation corresponds to at least one highlight of the event; wherein the at least one highlight playback data representation corresponding to the at least one highlight of the event includes at least one identifier;
decode the at least one playback instruction signal to produce at least one decoded playback instruction signal including a first viewable highlight playback of at least one viewable highlight playback corresponding to the at least one highlight playback data representation;
determine a current playback position of digital media data associated with the event;
determine a highlight playback position of the first viewable highlight playback based, at least in part, on the at least one identifier of the at least one highlight playback data representation corresponding to the at least one highlight of the event;
perform operations on the digital media data associated with the event based, at least in part, on the decoded playback instruction signal to update the current playback position with the highlight playback position of the first viewable highlight playback;
monitor the current playback position of the digital media data associated with the event to determine whether the first viewable highlight playback is being viewed;
determine, if the at least one viewable highlight playback does not include a successive highlight, whether the at least one playback instruction signal includes a successive playback instruction signal;
decode, if the at least one viewable highlight playback does not include the successive viewable highlight playback and if the at least one playback instruction signal includes the successive playback instruction signal, the successive playback instruction signal to produce a successive decoded playback instruction signal including a successive first viewable highlight playback of at least one successive viewable highlight playback corresponding to the at least one highlight playback data representation;
determine a current playback position of the digital media data associated with the event;
determine a successive highlight playback position of the successive first viewable highlight playback based, at least in part, on the at least one identifier of the at least one highlight playback data representation corresponding to the at least one highlight of the event; and
perform operations on the digital media data associated with the event based, at least in part, on the successive decoded playback instruction signal to update the current playback position with the successive highlight playback position of the successive first viewable highlight playback.

7. The device of claim 6, wherein the one or more processors are further configured to:
determine whether the at least one viewable playback includes a successive viewable highlight playback;

determine, if the at least one viewable highlight playback includes the successive viewable highlight playback, a successive playback position of the successive viewable highlight playback based, at least in part, on the at least one identifier of the at least one highlight playback data representation corresponding to the at least one highlight of the event; and update, if the first viewable highlight playback is no longer being viewed, the current playback position with the successive playback position.

8. The device of claim 6, wherein the current playback position of the digital media data associated with the event is monitored at least every 500 milliseconds.

9. The device of claim 6, wherein the one or more processors are further configured to:

update the current playback position with a new playback position of the digital media data associated with the event.

10. The device of claim 6, wherein the at least one identifier is at least one of a playback time associated with the corresponding at least one highlight of the event and a uniform resource locator (URL) associated with the corresponding at least one highlight of the event.

11. A method of controlling a viewing of a viewable highlight playback comprising the steps of:

receiving at least one playback instruction signal including at least one highlight playback data representation encoded from digital media data associated with an event; wherein the at least one highlight playback data representation corresponds to at least one highlight of the event; wherein the at least one highlight playback data representation corresponding to the at least one highlight of the event includes at least one identifier;

decoding the at least one playback instruction signal to produce at least one decoded playback instruction signal including a first viewable highlight playback of at least one viewable highlight playback corresponding to the at least one highlight playback data representation;

determining a current playback position of the digital media data associated with the event;

determining a highlight playback position of the first viewable highlight playback based, at least in part, on the at least one identifier of the one or more highlight data representations associated with the corresponding one or more highlights of the event;

performing operations on the digital media data associated with the event based, at least in part, on the decoded playback instruction signal to update the current playback position with the highlight playback position of the first viewable highlight playback;

monitoring the current playback position of the digital media data associated with the event to determine whether the first viewable highlight playback is being viewed;

determining, if the at least one viewable highlight playback does not include a successive highlight, whether the at least one playback instruction signal includes a successive playback instruction signal;

decoding, if the at least one viewable highlight playback does not include the successive viewable highlight playback and if the at least one playback instruction signal includes the successive playback instruction signal, the successive playback instruction signal to produce a successive decoded playback instruction signal including a successive first viewable highlight playback of at least one successive viewable highlight playback corresponding to the at least one highlight playback data representation;

determining a current playback position of the digital media data associated with the event;

determining a successive highlight playback position of the successive first viewable highlight playback based, at least in part, on the at least one identifier of the at least one highlight playback data representation corresponding to the at least one highlight of the event; and performing operations on the digital media data associated with the event based, at least in part, on the successive decoded playback instruction signal to update the current playback position with the successive highlight playback position of the successive first viewable highlight playback.

12. The method of claim 11, further comprising:

determining whether the at least one viewable playback includes a successive viewable highlight playback;

determining, if the at least one viewable highlight playback includes the successive viewable highlight playback, a successive playback position of the successive viewable highlight playback based, at least in part, on the at least one identifier of the at least one highlight playback data representation corresponding to the at least one highlight of the event; and updating, if the first viewable highlight playback is no longer being viewed, the current playback position with the successive playback position.

13. The method of claim 11, wherein the monitoring the current playback position of the digital media data associated with the event occurs at least every 500 milliseconds.

14. The method of claim 11, further comprising:

updating the current playback position with a new playback position of the digital media data associated with the event.

* * * * *